US010329891B2

United States Patent
Nguyen et al.

(10) Patent No.: US 10,329,891 B2
(45) Date of Patent: Jun. 25, 2019

(54) TREATING A SUBTERRANEAN FORMATION WITH A COMPOSITION HAVING MULTIPLE CURING STAGES

(71) Applicant: Halliburton Energy Services, Inc., Houston, TX (US)

(72) Inventors: Philip D. Nguyen, Houston, TX (US); Loan K. Vo, Houston, TX (US); Bradley J. Sparks, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/914,856

(22) PCT Filed: Dec. 11, 2013

(86) PCT No.: PCT/US2013/074408
§ 371 (c)(1),
(2) Date: Feb. 26, 2016

(87) PCT Pub. No.: WO2015/088515
PCT Pub. Date: Jun. 18, 2015

(65) Prior Publication Data
US 2016/0201443 A1    Jul. 14, 2016

(51) Int. Cl.
*E21B 43/267* (2006.01)
*C09K 8/56* (2006.01)
(Continued)

(52) U.S. Cl.
CPC ............ *E21B 43/267* (2013.01); *C09K 8/035* (2013.01); *C09K 8/62* (2013.01); *C09K 8/805* (2013.01)

(58) Field of Classification Search
CPC ...... E21B 43/267; E21B 43/025; E21B 43/26; C09K 8/805; C09K 8/56; C09K 8/62
See application file for complete search history.

(56) References Cited

U.S. PATENT DOCUMENTS

| 5,129,458 A | 7/1992 | King et al. |
| 5,501,274 A | 3/1996 | Nguyen et al. |
(Continued)

FOREIGN PATENT DOCUMENTS

| WO | WO-2012066125 A1 | 5/2012 |
| WO | WO-2015088515 A1 | 6/2015 |

OTHER PUBLICATIONS

"International Application Serial No. PCT/US2013/074408, International Search Report dated Sep. 25, 2014", 4 pgs.
(Continued)

*Primary Examiner* — Catherine Loikith
(74) *Attorney, Agent, or Firm* — Chamberlain Hrdlicka

(57) ABSTRACT

The present invention relates to compositions for treatment of subterranean formations including a curable resin that is amine-curable and a curing agent having a structure including at least one primary amine and at least one secondary amine, and methods of using the same. In various embodiments, the present invention provides a method of treating a subterranean formation. The method can include obtaining or providing a composition including a curable resin that is amine-curable and a curing agent having a structure including at least one primary amine and at least one secondary amine. The method can include placing the composition in a subterranean formation downhole.

18 Claims, 1 Drawing Sheet

(51) Int. Cl.
*C09K 8/62* (2006.01)
*C09K 8/035* (2006.01)
*C09K 8/80* (2006.01)

(56) References Cited

U.S. PATENT DOCUMENTS

| | | |
|---|---|---|
| 5,921,317 A | 7/1999 | Dewprashad et al. |
| 6,729,404 B2 | 5/2004 | Nguyen et al. |
| 6,962,200 B2 | 11/2005 | Nguyen et al. |
| 7,153,575 B2 | 12/2006 | Anderson et al. |
| 7,306,037 B2 | 12/2007 | Nguyen et al. |
| 2002/0048676 A1* | 4/2002 | McDaniel ............... A63K 1/00 428/404 |
| 2005/0059555 A1 | 3/2005 | Dusterhoft et al. |
| 2006/0157243 A1* | 7/2006 | Nguyen ............... C09K 8/805 166/280.2 |
| 2012/0071371 A1 | 3/2012 | Zhang |
| 2013/0225458 A1 | 8/2013 | Qin et al. |

OTHER PUBLICATIONS

"International Application Serial No. PCT/US2013/074408, Written Opinion dated Sep. 25, 2014", 4 pgs.

\* cited by examiner

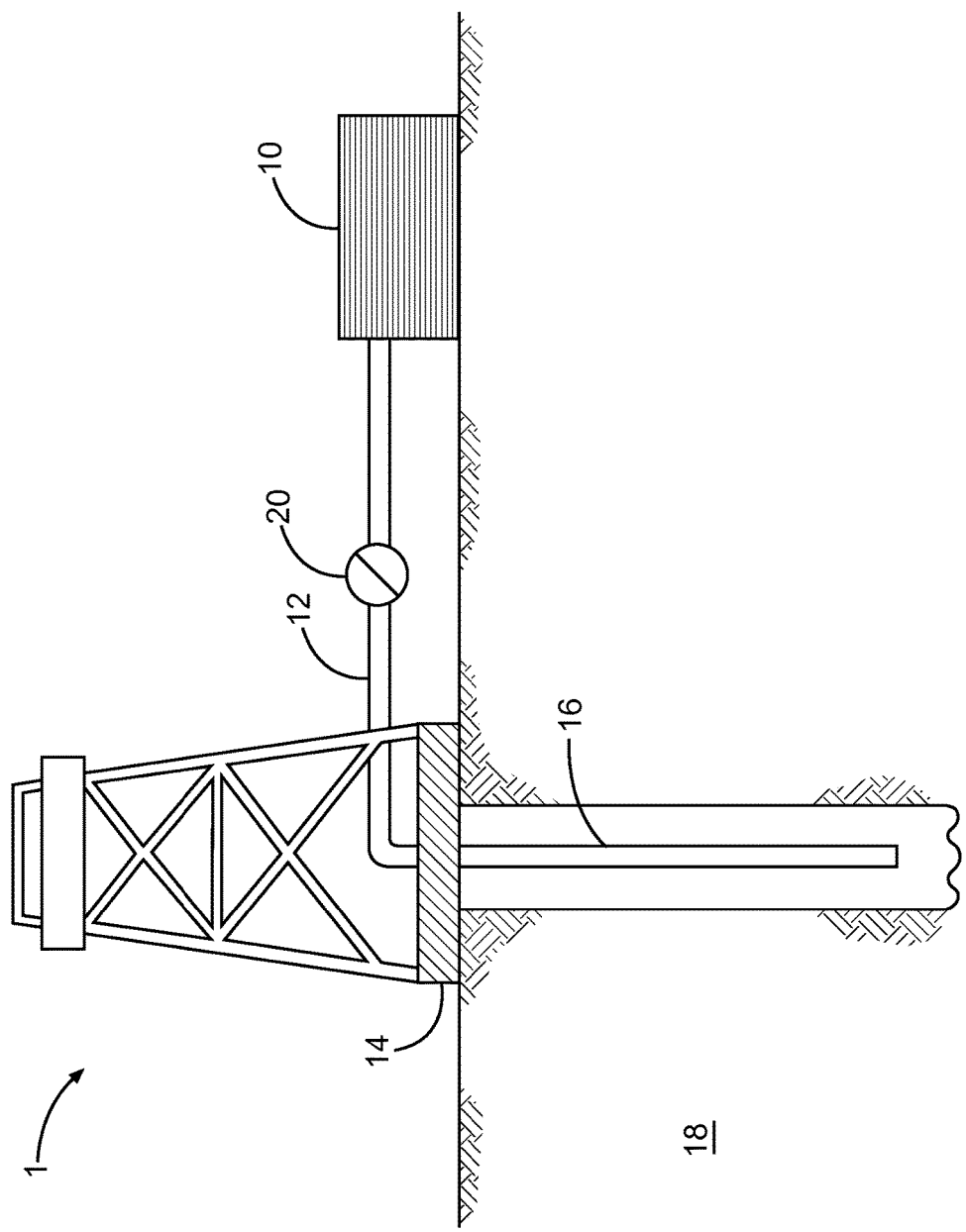

US 10,329,891 B2

TREATING A SUBTERRANEAN FORMATION WITH A COMPOSITION HAVING MULTIPLE CURING STAGES

PRIORITY APPLICATIONS

This application is a U.S. National Stage Filing under 35 U.S.C. 371 from International Application No. PCT/US2013/074408, filed on Dec. 11, 2013; and published as WO 2015/088515 on Jun. 18, 2015; which application and publication are incorporated herein by reference in their entirety.

BACKGROUND OF THE INVENTION

During hydraulic fracturing treatments of subterranean formations, one concern for operators is the settlement of curable resin-coated proppant inside the wellbore. Sometimes settlement can occur due to premature screenout, or from underflush (e.g., after injection of proppant mixture into fracture some proppant is left in the wellbore). Curable resin-coated proppant cures in a single curing stage to form a high-strength consolidated pack that requires the operator to use aggressive and time-consuming procedures for removal, such as hydrajetting, drilling, or reaming. If the contact points between the grains of a curable resin-coated proppant are disturbed during the single curing stage, the final consolidated pack is damaged and the consolidation strength is reduced.

SUMMARY OF THE INVENTION

In various embodiments, the present invention provides a method of treating a subterranean formation. The method includes obtaining or providing a composition. The composition includes a curable resin. The curable resin is amine-curable. The composition also includes a curing agent having a structure that includes at least one primary amine and at least one secondary amine. The method also includes placing the composition in a subterranean formation downhole.

In various embodiments, the present invention provides a method of treating a subterranean formation. The method includes obtaining or providing a mixture that includes a curable resin, wherein the resin is amine-curable. The mixture includes a curing agent including at least one primary amine and at least one secondary amine. The mixture also includes a surfactant and a carrier fluid. The method includes coating the mixture on a proppant or gravel, to provide a composition. The method includes placing the composition in a subterranean formation, such that the composition contacts a fracture in the subterranean formation. The method includes curing the composition.

In various embodiments, the present invention provides a system including a composition. The composition includes a curable resin, wherein the resin is amine-curable. The composition includes a curing agent having a structure comprising at least one primary amine and at least one secondary amine. The composition also includes a proppant or gravel. The system includes a subterranean formation comprising the composition therein.

In various embodiments, the present invention provides a composition for treatment of a subterranean formation. The composition includes a curable resin, wherein the resin is amine-curable. The composition includes a curing agent having a structure comprising at least one primary amine and at least one secondary amine. The composition also includes a proppant or gravel.

In various embodiments, the present invention provides a composition for treatment of a subterranean formation. The composition includes a curable epoxy or isocyanate resin, wherein the resin is amine-curable. The composition includes a curing agent having a structure comprising at least one primary amine and at least one secondary amine, the curing agent having the structure

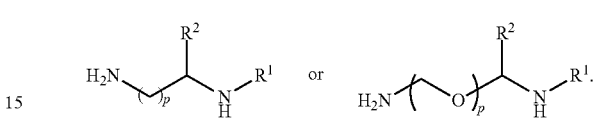

The variable $R^1$ is selected from the group consisting of $(C_1\text{-}C_8)$alkyl, $(C_5\text{-}C_{15})$aryl, $(C_5\text{-}C_{15})$heteroaryl, and —OH. The variable $R^2$ is selected from the group consisting of $(C_1\text{-}C_8)$alkyl, $(C_5\text{-}C_{15})$aryl, $(C_5\text{-}C_{15})$heteroaryl, —H, halo, nitro, trihalomethyl, cyano, and —OH. The variable p is about 1 to about 6. The composition also includes a proppant or gravel.

In various embodiments, the present invention provides a method of preparing a composition for treatment of a subterranean formation. The method includes forming a composition including a curable resin, wherein the resin is amine-curable. The composition includes a curing agent having a structure comprising at least one primary amine and at least one secondary amine. The composition also includes a proppant or gravel.

Various embodiments of the present invention have advantages over other compositions and methods for consolidating gravel or proppant in a subterranean formation, at least some of which are unexpected. Various embodiments of the composition can provide at least two stages of curing, the first stage including the curing action of the primary amine in the curing agent, and the second stage including the curing action of the secondary amine in the curing agent. The multiple curing stages can allow various embodiments of the composition having contact points between proppant particles disturbed during curing to heal and form stronger consolidated proppant or gravel packs than other compositions disturbed during curing. Unlike other compositions that form consolidated proppant and gravel pack in a single curing stage and can require expensive and time consuming procedures to remove from areas of unintended application such as hydrajetting, drilling, or reaming, various embodiments of the present composition can be more easily removed prior to the completion of the final curing stage, such as by simply jetting and washing out. The easier removability of various embodiments from downhole areas of unintended application can result in more productive wells and less interference with other downhole treatments. Unlike other curable mixtures, in various embodiments, by appropriately modifying the structure of the curing agent, such as by increasing or decreasing the steric hindrance around the primary or secondary amine, the properties of the curing process of the composition can be tuned to specific desired parameters, such as the number of cure stages, the strength of each cure stage, the duration of each cure stage, and the rate of a cure stage at a downhole temperature. In various embodiments proppant is pre-coated with a multiple curing stage resin, while other embodiments provide on-the-fly application of the resin to a proppant during hydraulic treatment.

BRIEF DESCRIPTION OF THE FIGURES

The drawings illustrate generally, by way of example, but not by way of limitation, various embodiments discussed in the present document.

FIG. 1 illustrates a system or apparatus for delivering a composition downhole, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)R, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)₂, SR, SOR, SO₂R', SO₂N(R)₂, SO₃R, C(O)R, C(O)C(O)R, C(O)CH₂C(O)R, C(S)R, C(O)OR, OC(O)R, C(O)N(R)₂, OC(O)N(R)₂, C(S)N(R)₂, (CH₂)₀₋₂N(R)C(O)R, (CH₂)₀₋₂N(R)N(R)₂, N(R)N(R)C(O)R, N(R)N(R)C(O)OR, N(R)N(R)CON(R)₂, N(R)SO₂R, N(R)SO₂N(R)₂, N(R)C(O)OR, N(R)C(O)R, N(R)C(S)R, N(R)C(O)N(R)₂, N(R)C(S)N(R)₂, N(COR)COR, N(OR)R, C(=NH)N(R)₂, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH₃), —CH=C(CH₃)₂, —C(CH₃)=CH₂, —C(CH₃)=CH(CH₃), —C(CH₂CH₃)=CH₂, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH₃), —C≡C(CH₂CH₃), —CH₂C≡CH, —CH₂C≡C(CH₃), and —CH₂C≡C(CH₂CH₃) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C₂-heterocyclyl can be a 5-ring with two carbon atoms and three heteroatoms, a 6-ring with two carbon atoms and four heteroatoms and so forth. Likewise a C₄-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)₃ wherein each group can independently be H or non-H, such as alkyl, aryl, and the like. Amines include but are not limited to R—NH₂, for example, alkylamines, arylamines, alkylarylamines; R₂NH wherein each R is independently selected, such as dialkylamines, diarylamines, aralkylamines, heterocyclylamines and the like; and R₃N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

In some embodiments, the present invention provides a method of treating a subterranean formation. The method includes obtaining or providing a composition including a curable resin that is amine-curable and a curing agent having a structure including at least one primary amine and at least one secondary amine. The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing. The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In various embodiments, the method can be used to provide delayed consolidation of formation sand or proppant in any suitable region of the subterranean region and during any suitable treatment. In some examples, the method can be used to treat near-wellbore formations, such as while drilling a production interval or during one or more injection intervals designed for water injection.

The method can include combining the curable resin and curing agent with a proppant or gravel above-surface or downhole. For example, in some embodiments, the composition further includes at least one of proppant and gravel. In some embodiments, the method includes placing proppant in the subterranean formation prior to placing the composition in the subterranean formation. The method can be a method of remedial proppant or gravel treatment. In some embodiments, the method includes placing proppant in the subterranean formation after placing the composition in the subterranean formation. The method can include coating a mixture including the curable resin and the curing agent on the proppant or gravel.

The proppant or gravel can be any suitable proppant or gravel. A proppant is a material that keeps an induced hydraulic fracture at least partially open during or after a fracturing treatment. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The proppant or gravel can form any suitable wt % of the composition, such as about 1 wt % to about 90 wt/a, or about 5 wt % to about 70 wt %, or about 1 wt % or less, or about 2, 3, 4, 5, 10, 15, 20, 25, 30, 35, 40, 45, 50, 55, 60, 65, 70, 75, 80, 85 wt %, or about 90 wt % or more.

The combination of a primary amine and a secondary amine on the chemical structure of the curing agent provides embodiments of the composition with at least two curing stages. The first curing stage is associated with the curing action from the less sterically hindered primary amine, which predominantly reacts with the curable resin before the secondary amine. The second curing stage is associated with the curing action from the more sterically hindered secondary amine, which predominantly reacts with the curable resin after the primary amine. The composition can have more than two curing stages. The first and second curing stages can be of any duration with respect to one another. In some embodiments, the first and second curing stages overlap, slightly, moderately, or extensively, while in other embodiments, the first and second curing stages substantially do not overlap. In various embodiments, the consolidation strength during or after the first curing stage can be less than the consolidation strength during or after the second curing stage. In some embodiments, the first curing stage can be slower than the second curing stage, providing a delayed curing composition.

The method can include allowing the composition to at least partially cure, such that at least one curing stage is at least partially completed, such as by allowing the composition time under suitable conditions for a chemical reaction between the curing agent and the amine-curable resin to occur. The curing occurs at least in part downhole. Some portions of the curing can occur at the surface before placing the composition in the subterranean formation, and during transport of the composition downhole, but curing predominantly occurs downhole.

Various embodiments can include at least partially removing partially cured resin before the full curing process is complete. The removal can occur by any suitable means, such as by jetting and washing out, by chemical dissolution, or by more intensive physical methods such as drilling or reaming. In some embodiments, the removal can occur via use of coiled tubing with a jetting tool attached. In some embodiments, the removal can occur via use of coiled tubing with a drill bit or reamer. The removal can include removal of partially cured composition that was not placed in the fracture or flowpath, such as partially cured composition in the wellbore or in a tubular. Any suitable amount of the partially cured composition or of the partially cured resin can be removed, such as about 0.01 wt % to about 80 wt % of the composition or resin, or about 0.01 wt % or less, or about 0.1 wt %, 1, 2, 3, 4, 5, 10, 15, 20, 25, 30, 35, 40, 45, 50, 55, 60, 65, 70, 75, or about 80 wt % or more.

In some embodiments, the method includes treating proppant on-the-fly during a hydraulic fracturing treatment or a screenless frac-pack treatment. The method can include mixing of the amine-curable resin, the amine curing agent, and any other suitable components, to form a single, homogenous mixture. The method can include coating of the resin mixture on the proppant. The method can include adding and mixing the resin-coated proppant in a fracturing carrier fluid. The method can include injecting the resin treated proppant slurry into a wellbore to be placed in a generated fracture located in the subterranean formation. The method can include allowing the resin coated on the proppant to be cured with time to slowly transform the loose proppant pack into a competent, consolidated, permeable proppant pack for controlling proppant flowback during well production or to immobilize the proppant.

In some embodiments, the method includes treating proppant on-the-fly during a hydraulic fracturing treatment or a screenless frac-pack treatment. The method can include mixing of the amine-curable resin, the amine curing agent, and any other suitable components, to form a single, homogenous mixture. The method can include coating of the resin mixture on the proppant while the proppant is being mixed in a fracturing carrier fluid. The method can include injecting the resin treated proppant slurry into a wellbore to be placed in a generated fracture located in the subterranean formation. The method can include allowing the resin coated on the proppant to be cured with time to slowly transform the loose proppant pack into a competent, consolidated, permeable proppant pack for controlling proppant flowback during well production or immobilize the proppant.

Curable Resin.

The composition includes a curable resin that is amine-curable, such that a suitable primary amine or secondary amine-containing compound can cure the resin. The amine-curable resin can form any suitable wt % of the composition, such as about 0.01 wt % to about 50 wt %, about 1 wt % to about 30 wt %, about 0.01 wt % or less, or about 0.1 wt %, 1, 2, 3, 4, 5, 10, 15, 20, 25, 30, 35, 40, 45, or about 50 wt % or more.

The amine-curable resin can be any suitable amine-curable resin, such that the method can be performed as described herein. In some examples, the curable resin is an epoxy resin or an isocyanate resin. The curable resin can be bisphenol A-epichlorohydrin resin used in Expedite® 225. In some examples, the curable resin is a bisphenol A-epichlorohydrin resin, a bisphenol A diglycidyl ether resin, a butoxymethyl butyl glycidyl ether resins, a bisphenol F resin, a glycidyl ether resin, a polyepoxide resin, a polyisocyanate resin, a urethane resin, or a polyester resin.

Curing Agent.

The composition includes a curing agent having a chemical structure that includes at least one primary amine and at least one secondary amine. Any suitable wt % of the composition can be the curing agent, such as about 0.01 wt % to about 50 wt %, about 1 wt % to about 30 wt %, or about 0.01 wt % or less, or about 0.1 wt %, 1, 2, 3, 4, 5, 10, 15, 20, 25, 30, 35, 40, 45, or about 50 wt % or more. The curing agent can be any suitable curing agent, such that the method can be carried out as described herein. In some embodiments, the curing agent is at least one of an unsymmetrical diamine and a polyamine.

In some embodiments, the curing agent has the structure:

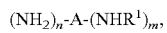

The variable A can be selected from the group consisting of a substituted or unsubstituted $(C_1-C_{30})$hydrocarbylene interrupted or terminated by 0, 1, 2, or 3 O or S atoms, and a substituted or unsubstituted $(C_2-C_5)$hydrocarbylenepoly(oxy$(C_2-C_5)$hydrocarbylene). The variable $R^1$ at each occurrence is independently selected from the group consisting of substituted or unsubstituted $(C_1-C_{30})$hydrocarbyl interrupted or terminated by 0, 1, 2, or 3 O or S atoms, substituted or unsubstituted $(C_2-C_5)$hydrocarbylenepoly(oxy$(C_2-C_5)$hydrocarbylene), substituted or unsubstituted $(C_1-C_{30})$heteroaryl, and —OH. The variables n and m are each independently about 1 to about 1,000. In some embodiments, the variables n and m can each equal 1 and the curing agent has the structure:

In some embodiments, A can be a $(C_1-C_{30})$hydrocarbylene. The variable A can be a $(C_1-C_{15})$hydrocarbylene. The variable A can be a $(C_1-C_{15})$alkyl. The variable $R^1$ at each occurrence is independently selected from the group consisting of $(C_1-C_{30})$hydrocarbyl, $(C_2-C_5)$hydrocarbylenepoly(oxy$(C_2-C_5)$hydrocarbylene), $(C_1-C_{30})$heteroaryl, and —OH. The variable $R^1$ at each occurrence can be independently selected from the group consisting of $(C_1-C_{15})$hydrocarbyl, $(C_2)$hydrocarbylenepoly(oxy$(C_2)$hydrocarbylene), $(C_1-C_{15})$heteroaryl, and —OH. The variable $R^1$ at each occurrence is selected from the group consisting of $(C_1-C_8)$alkyl, $(C_5-C_{15})$aryl, and $(C_5-C_{15})$heteroaryl.

In some embodiments, the curing agent has the structure:

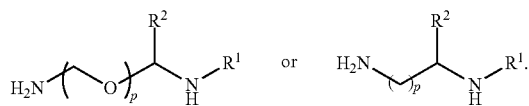

The variable $R^2$ can be a bulky alkyl functional group (e.g., straight, branched, or cyclic) or can be aryl or an electron withdrawing substituent. In some examples, $R^2$ can be selected from the group consisting of substituted or unsubstituted $(C_1-C_{30})$hydrocarbyl interrupted or terminated by 0, 1, 2, or 3 O or S atoms, substituted or unsubstituted $(C_2-C_5)$hydrocarbylenepoly(oxy$(C_2-C_5)$hydrocarbylene), substituted or unsubstituted $(C_1-C_{30})$heteroaryl, —H, halo, nitro, trihalomethyl, cyano, and —OH. The variable p can be about 0 to about 30, or about 1 to about 15, or about 1 to about 6.

In some embodiments, $R^2$ can be selected from the group consisting of $(C_1-C_{30})$hydrocarbyl, $(C_2-C_5)$hydrocarbylenepoly(oxy$(C_2-C_5)$hydrocarbylene), $(C_1-C_{30})$heteroaryl, —H, halo, nitro, trihalomethyl, cyano, and —OH. The variable $R^2$ can be selected from the group consisting of $(C_1-C_{15})$hydrocarbyl, $(C_2)$hydrocarbylenepoly(oxy$(C_2)$hydrocarbylene), $(C_1-C_{15})$heteroaryl, —H, halo, nitro, trihalomethyl, cyano, and —OH. The variable $R^2$ can be selected from the group consisting of $(C_1-C_8)$alkyl, $(C_5-C_{15})$aryl, $(C_5-C_{15})$heteroaryl, halo, nitro, trihalomethyl, cyano, and —OH.

Other Components

In addition to the amine-curable resin and the curing agent having at least one primary amine and at least one secondary amine, the composition can have any suitable additional components in any suitable concentration, such that the composition can be used to perform the method described herein.

In some embodiments, the composition further comprises at least one tackifier. The tackifier can be any suitable wt % of the composition, such as about 0.001 wt % to about 50 wt %, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The tackifier can be any suitable material having tackiness. For example, the tackifier can be an adhesive or a resin. The term "resin" as used herein refers to any of numerous physically similar polymerized synthetics or chemically modified natural resins including thermoplastic materials and thermosetting materials. In some embodiments, the tackifier can be at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin. In some embodiments, the tackifier can be at least one of bisphenol A diglycidyl ether resin, butoxymethyl butyl glycidyl ether resin, bisphenol A-epichlorohydrin resin, and bisphenol F resin. In some embodiments, the tackifier can be at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidemethylpropane sulfonate polymer or copolymer or derivative thereof, and an acrylic acid/acrylamidemethylpropane sulfonate copolymer. In some embodiments, the tackifier can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the tackifier can include an amine-containing polymer. In some embodiments, the tackifier can be hydrophobically-modified. In some embodiments, the tackifier can include at least one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer comprising monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one $C_4$-$C_{30}$ hydrocarbyl comprising at least one of a straight chain, a branched chain, an unsaturated C—C bond, an aryl group, and any combination thereof.

In some embodiments, the composition can further include a second curing agent. The second curing agent can be any suitable curing agent. For example, the second curing agent can include at least one of an amine, an aromatic amine, an aliphatic amine, a cyclo-aliphatic amine, polyamines, amides, polyamides, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenanthroline, phenazine, imidazolidine, phenoxazine, cinnoline, pyrrolidine, pyrroline, imidazoline, piperidine, indoline, isoindoline, quinuclidine, morpholine, azocine, azepine, azepine, 1,3,5-triazine, thiazole, pteridine, dihydroquinoline, hexa methylene imine, indazole, polyamines, amides, polyamides, 2-ethyl-4-methyl imidazole, 1,1,3-trichlorotrifluoroacetone, and combinations thereof. The second curing agent can form any suitable wt % of the composition, such as about 0.001 wt % to about 50 wt %, about 0.01 wt % to about 20 wt %, or about 0.001 wt % or less, or about 0.01 wt %, 1, 2, 3, 4, 5, 10, 15, 20, 25, 30, 35, 40, 45, or about 50 wt % or more.

In some embodiments, the composition can further include a carrier fluid. The composition can include any suitable carrier fluid, such as at least one of an aqueous liquid, an organic liquid, and an oil. The carrier fluid can be any suitable wt % of the composition, such as about 5 wt % to about 95 wt %, about 20 wt % to about 70 wt %, or about 5 wt % or less, or about 10, 15, 20, 25, 30, 35, 40, 45, 50, 55, 60, 65, 70, 75, 80, 85, 90, or about 95 wt % or more. Examples of the carrier fluid can include diethylene glycol monomethyl or dimethyl ether, methanol, dipropylene glycol monomethyl ether, dipropylene glycol dimethyl ether, dimethyl formamide, ethylene glycol butyl ether, diethylene glycol butyl ether, propylene carbonate, d-limonene, fatty acid methyl esters, propylene glycol butyl ether, ethylene glycol monoacetate, triethylene glycol monoethyl ether, 1,1'-oxybis(2-propanol), triethylene glycol monomethyl ether, triglyme, diglyme, and combinations thereof.

In some embodiments, the composition further includes a silane coupling agent. The silane coupling agent can be any suitable silane coupling agent. For example, the silane coupling agent can be a hydrocarbyl-substituted trimethoxysilane, wherein the hydrocarbyl group is substituted or unsubstituted. The silane coupling agent can be N-2-(aminoethyl)-3-aminopropyltrimethoxysilane, 3-glycidoxypropyltrimethoxysilane, or n-beta-(aminoethyl)-gamma-aminopropyltrimethoxysilane. Any suitable amount of the composition can be the silane coupling agent, such as about 0.001 wt % to about 20 wt %, or about 0.001 wt % to about 3 wt %, or about 0.001 wt % or less, or about 0.01, 0.1, 1, 2, 3, 4, 5, 6, 8, 10, 12, 14, 16, 18, or about 20 wt % or more.

In some embodiments, the composition further includes a surfactant. The surfactant can be any suitable surfactant, such as a cationic surfactant, an anionic surfactant, or a non-ionic surfactant. In some embodiments, the surfactant can be at least one of an ethoxylated nonyl phenol phosphate ester and a $C_{12}$-$C_{22}$ alkyl phosphonate. The surfactant can form any suitable amount of the composition, such as about 0.01 wt % to about 50 wt %, or about 0.1 wt % to about 10 wt %, or about 0.01 wt % or less, or about 0.1, 1, 2, 3, 4, 5, 10, 15, 20, 25, 30, 35, 40, 45, or about 50 wt % or more.

In one example, the surfactant is sorbitan monooleate. In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant.

Examples of suitable cationic surfactants can include, but are not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

Examples of suitable anionic surfactants can include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of suitable non-ionic surfactants can include, but are not limited to, condensates of ethylene oxide with long chain fatty alcohols or fatty acids such as a ($C_{12-16}$) alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols.

In some embodiments, the surfactant can be selected from Tergitol™ 15-s-3, Tergitol™ 15-s-40, sorbitan monooleate, polylycol-modified trimethsilylated silicate, polyglycol-modified siloxanes, polyglycol-modified silicas, ethoxylated quaternary ammonium salt solutions, and cetyltrimethylammonium chloride solutions.

In some embodiments, the composition can further include a hydrolyzable ester. The hydrolyzable ester can be any suitable hydrolyzable ester. For example, the hydrolyzable ester can be a $C_1$-$C_5$ mono-, di-, tri-, or tetra-alkyl ester of a $C_2$-$C_{40}$ mono-, di-, tri-, or tetra-carboxylic acid. The hydrolyzable ester can be at least one of dimethylglutarate, dimethyladipate, dimethylsuccinate, sorbitol, catechol, dimethylthiolate, methyl salicylate, dimethylsalicylate, and tert-butylhydroperoxide. Any suitable wt % of the composition can be the hydrolyzable ester, such as about 0.01 wt % to about 20 wt %, or about 0.1 wt % to about 5 wt %, or about 0.01 wt % or less, or about 0.1 wt %, 1, 2, 3, 4, 5, 6, 8, 10, 12, 14, 16, 18, or about 20 wt % or more.

In some embodiments, the composition includes at least one of a gel or a crosslinked gel. For example, the gel or crosslinked gel can include at least one of a linear polysaccharide and a poly(($C_2$-$C_{10}$)alkenylene), wherein the ($C_2$-$C_{10}$)alkenylene is substituted or unsubstituted. In some examples, the gel or crosslinked gel can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly (vinyl pyrrolidone), polyacrylamide, poly (hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The gel or crosslinked gel can form any suitable proportion of the composition, such as about 0.001 wt % to about 10 wt % of the composition, about 0.001 wt % or less, or about 0.005 wt %, 0.01, 0.05, 0.1, 0.2, 0.3, 0.4, 0.5, 0.6, 0.7, 0.8, 0.9, 1, 1.5, 2, 3, 4, 5, 6, 7, 8, 9, or about 10 wt % of the composition.

In some examples, the composition further includes at least one crosslinking agent. The crosslinking agent can be any suitable crosslinking agent. For example, the crosslinking agent can include at least one of chromium, aluminum, antimony, zirconium, titanium, calcium, boron, iron, silicon, copper, zinc, magnesium, and an ion thereof. The crosslinking agent can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octabcrate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate. The crosslinker can be present in any suitable proportion of the composition, such as about 0.000,001 wt % to about 5 wt % of the composition, about 0.001 wt % to about 2 wt % of the composition, or about 0.000,001 wt % or less, or about 0.000,01 wt %, 0.000,1, 0.001, 0.01, 0.1, 1, 1.5, 2, 2.5, 3, 3.5, 4, 4.5, or about 5 wt % of the composition or more.

Downhole Mixture or Composition

The composition including the curable resin and the curing agent can be combined with any suitable downhole fluid before, during, or after the placement of the composition in the subterranean formation or the contacting of the composition and the subterranean material. In some examples, the composition including the curable resin and the curing agent is combined with a downhole fluid above the surface, and then the combined composition is placed in a subterranean formation or contacted with a subterranean material. In another example, the composition including the curable resin and the curing agent is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

In various embodiments, the method includes combining the composition including the curable resin and the curing agent with any suitable downhole fluid, such as an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. Any suitable weight percent of a mixture that is placed in the subterranean formation or contacted with the subterranean material can be the composition including the curable resin and the curing agent, such as about 0.000,000, 01 wt % to 99.999,99 wt %, 0.000,1 wt %-99.9 wt %, 0.1 wt % to 99.9 wt %, or about 20 wt %-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9 wt %, or about 99.999,99 wt % or more of the mixture or composition.

In some embodiments, the composition can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a HTHP filtration control agent including a crosslinked copolymer; DURATONE® HT, a filtration control agent that includes an organophilic lignite, more particularly organophilic leonardite; THERMO TONE™, a high temperature high pressure (HTHP) filtration control agent including a synthetic polymer, BDF™-366, a HTHP filtration control agent; BDF™-454, a HTHP filtration control agent; LIQUITONE™, a polymeric filtration agent and viscosifier; additives for HTHP emulsion stability, for example, FACTANT®, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber, STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition can include any optional component listed in this paragraph, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000, 1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

System or Apparatus.

In various embodiments, the present invention provides a system. The system can be any suitable system that can include the use of the composition described herein in a subterranean formation, or that can include performance of a method for using the composition described herein. The system can include a composition including a curable resin, wherein the resin is amine-curable. The composition can include a curing agent having a structure comprising at least one primary amine and at least one secondary amine. The composition can also include a proppant or gravel. The system can also include a subterranean formation including the composition therein.

In various embodiments, the present invention provides an apparatus. The apparatus can be any suitable apparatus that can be used to perform a method for using the composition described herein.

Various embodiments provide systems and apparatus configured for delivering the composition described herein to a downhole location and for using the composition therein, such as for fracturing, for depositing proppant in a fracture, or a combination thereof. In various embodiments, the systems can include a pump fluidly coupled to a tubular (e.g., any suitable type of oilfield pipe, such as pipeline, drill pipe, production tubing, and the like), the with tubular containing a composition including the composition described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

FIG. 1 shows an illustrative schematic of systems and apparatuses that can deliver embodiments of the compositions of the present invention to a downhole location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in or devoid of the curable resin, curing agent, and proppant. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein. The composition can be any suitable composition described herein.

For example, the composition can include a curable resin, wherein the resin is amine-curable. The composition can include a curing agent having a structure comprising at least one primary amine and at least one secondary amine. The composition can also include a proppant or gravel.

In some embodiments, the composition can include a surfactant and a carrier fluid. In some embodiments, the composition further includes a downhole fluid. The downhole fluid can be any suitable downhole fluid. In some embodiments, the downhole fluid is a composition for fracturing of a subterranean formation or subterranean material, or a fracturing fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a curable resin, wherein the resin is amine-curable. The composition can include a curing agent having a structure comprising at least one primary amine and at least one secondary amine. The composition can also include a proppant or gravel.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

obtaining or providing a composition comprising
a curable resin, wherein the resin is amine-curable; and
a curing agent having a structure comprising at least one primary amine and at least one secondary amine; and
placing the composition in a subterranean formation downhole.

Embodiment 2 provides the method of Embodiment 1, wherein the obtaining or providing of the composition occurs above-surface.

Embodiment 3 provides the method of any one of Embodiments 1-2, wherein the obtaining or providing of the composition occurs downhole.

Embodiment 4 provides the method of any one of Embodiments 1-3, further comprising placing proppant in the subterranean formation prior to placing the composition in the subterranean formation.

Embodiment 5 provides the method of any one of Embodiments 1-4, further comprising placing proppant in the subterranean formation after placing the composition in the subterranean formation.

Embodiment 6 provides the method of any one of Embodiments 1-5, wherein the composition further comprises at least one of proppant and gravel.

Embodiment 7 provides the method of Embodiment 6, wherein the proppant or gravel is about 1 wt % to about 90 wt % of the composition.

Embodiment 8 provides the method of any one of Embodiments 6-7, wherein the proppant or gravel is about 5 wt % to about 70 wt % of the composition.

Embodiment 9 provides the method of any one of Embodiments 6-8, wherein the method further comprises coating a mixture comprising the curable resin and the curing agent on the proppant or gravel.

Embodiment 10 provides the method of any one of Embodiments 1-9, comprising placing the composition in at least one of a fracture and flowpath in the subterranean formation.

Embodiment 11 provides the method of Embodiment 10, wherein the fracture is present in the subterranean formation when the composition is placed in the subterranean formation.

Embodiment 12 provides the method of any one of Embodiments 10-11, wherein the method comprises forming the fracture or flowpath.

Embodiment 13 provides the method of any one of Embodiments 1-12, comprising fracturing the subterranean formation to form at least one fracture in the subterranean formation.

Embodiment 14 provides the method of any one of Embodiments 1-13, wherein the method is a method of remedial proppant or gravel treatment.

Embodiment 15 provides the method of any one of Embodiments 1-14, wherein the method is a method of near-wellbore treatment during a drilling operation.

Embodiment 16 provides the method of any one of Embodiments 1-15, further comprising at least partially curing the composition.

Embodiment 17 provides the method of Embodiment 16, comprising curing the composition with time.

Embodiment 18 provides the method of any one of Embodiments 16-17, wherein the curing occurs at least in part downhole.

Embodiment 19 provides the method of any one of Embodiments 16-18, wherein the curing occurs at least in part before the placement of the composition in the subterranean formation.

Embodiment 20 provides the method of any one of Embodiments 16-19, wherein curing occurs, at least in part, at least one of during and after the placement of the composition in the subterranean formation.

Embodiment 21 provides the method of any one of Embodiments 16-20, further comprising removing partially cured resin before the curing is complete.

Embodiment 22 provides the method of Embodiment 21, wherein about 0.01 wt % to about 80 wt % of the composition is removed before curing is complete.

Embodiment 23 provides the method of any one of Embodiments 1-22, wherein the composition has at least a first and a second curing stage, a consolidation strength of the first stage being less than a consolidation strength of the second stage.

Embodiment 24 provides the method of Embodiment 23, wherein the first curing stage comprises curing of the curable resin with the primary amine group of the curing agent, wherein the second curing stage comprises curing of the curable resin with the secondary amine of the curing agent.

Embodiment 25 provides the method of any one of Embodiments 1-24, wherein the curable resin comprises at least one of an epoxy resin and an isocyanate resin.

Embodiment 26 provides the method of Embodiment 25, wherein the curable resin comprises at least one of a bisphenol A-epichlorohydrin resin, a bisphenol A diglycidyl ether resin, a butoxymethyl butyl glycidyl ether resins, a bisphenol F resin, a glycidyl ether resin, a polyepoxide resin, a polyisocyanate resin, a urethane resin, and a polyester resin.

Embodiment 27 provides the method of any one of Embodiments 25-26, wherein the curable resin is about 0.01 wt % to about 50 wt % of the composition.

Embodiment 28 provides the method of any one of Embodiments 25-27, wherein the curable resin is about 1 wt % to about 30 wt % of the composition.

Embodiment 29 provides the method of any one of Embodiments 1-28, wherein the composition further comprises at least one tackifier.

Embodiment 30 provides the method of Embodiment 29, wherein the tackifier comprises at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, a phenol/phenol formaldehyde/furfuryl alcohol resin, bisphenol A diglycidyl ether resin, butoxymethyl butyl glycidyl ether resin, bisphenol A-epichlorohydrin resin, bisphenol F resin, an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidemethylpropane sulfonate polymer or copolymer or derivative thereof, an acrylic acid/acrylamidemethylpropane sulfonate copolymer, a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, a condensation reaction product of a polyacid and a polyamine, and a hydrophobically-modified amine-containing polymer.

Embodiment 31 provides the method of any one of Embodiments 29-30, wherein the tackifier is about 0.001 wt % to about 50 wt % of the composition.

Embodiment 32 provides the method of any one of Embodiments 29-31, wherein the tackifier is about 0.01 wt % to about 30 wt % of the composition.

Embodiment 33 provides the method of any one of Embodiments 1-32, wherein about 0.01 wt % to about 50 wt % of the composition is the curing agent.

Embodiment 34 provides the method of any one of Embodiments 1-33, wherein about 1 wt % to about 30 wt % of the composition is the curing agent.

Embodiment 35 provides the method of any one of Embodiments 1-34, wherein the curing agent is at least one of an unsymmetrical diamine and a polyamine.

Embodiment 36 provides the method of any one of Embodiments 1-35, wherein the curing agent has the structure:

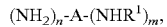

wherein
A is selected from the group consisting of a substituted or unsubstituted $(C_1-C_{30})$hydrocarbylene interrupted or terminated by 0, 1, 2, or 3 O or S atoms, and a substituted or unsubstituted $(C_2-C_5)$hydrocarbylenepoly(oxy$(C_2-C_5)$hydrocarbylene);
$R^1$ at each occurrence is independently selected from the group consisting of substituted or unsubstituted $(C_1-C_{30})$hydrocarbyl interrupted or terminated by 0, 1, 2, or 3 O or S atoms, substituted or unsubstituted $(C_2-C_5)$hydrocarbylenepoly(oxy$(C_2-C_5)$hydrocarbylene), substituted or unsubstituted $(C_1-C_{30})$heteroaryl, and —OH; and
n and m are each independently about 1 to about 1,000.

Embodiment 37 provides the method of Embodiment 36, wherein the curing agent has the structure:

$H_2N-A-NHR^1$.

Embodiment 38 provides the method of any one of Embodiments 36-37, wherein A is a $(C_1-C_{30})$hydrocarbylene.

Embodiment 39 provides the method of any one of Embodiments 36-38, wherein A is a $(C_1-C_{15})$hydrocarbylene.

Embodiment 40 provides the method of any one of Embodiments 36-39, wherein A is a $(C_1-C_{15})$alkyl.

Embodiment 41 provides the method of any one of Embodiments 36-40, wherein $R^1$ at each occurrence is independently selected from the group consisting of $(C_1-C_{30})$hydrocarbyl, $(C_2-C_5)$hydrocarbylenepoly(oxy$(C_2-C_5)$hydrocarbylene), $(C_1-C_{30})$heteroaryl, and —OH.

Embodiment 42 provides the method of any one of Embodiments 36-41, wherein $R^1$ at each occurrence is independently selected from the group consisting of $(C_1-C_{30})$hydrocarbyl, $(C_2)$hydrocarbylenepoly(oxy$(C_2)$hydrocarbylene), $(C_1-C_{15})$heteroaryl, and —OH.

Embodiment 43 provides the method of any one of Embodiments 36-42, wherein $R^1$ at each occurrence is selected from the group consisting of $(C_1-C_8)$alkyl, $(C_5-C_{15})$aryl, and $(C_5-C_{15})$heteroaryl.

Embodiment 44 provides the method of any one of Embodiments 36-43, wherein the curing agent has the structure:

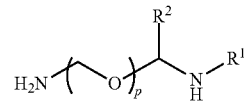

wherein
$R^2$ is selected from the group consisting of substituted or unsubstituted $(C_1-C_{30})$hydrocarbyl interrupted or terminated by 0, 1, 2, or 3 O or S atoms, substituted or unsubstituted $(C_2-C_5)$hydrocarbylenepoly(oxy$(C_2-C_5)$ hydrocarbylene), substituted or unsubstituted $(C_1-C_{30})$ heteroaryl, —H, halo, nitro, trihalomethyl, cyano, and —OH; and
p is about 1 to about 30.

Embodiment 45 provides the method of any one of Embodiments 36-44, wherein the curing agent has the structure:

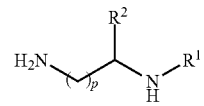

wherein
$R^2$ is selected from the group consisting of substituted or unsubstituted $(C_1-C_{30})$hydrocarbyl interrupted or terminated by 0, 1, 2, or 3 O or S atoms, substituted or unsubstituted $(C_2-C_5)$hydrocarbylenepoly(oxy$(C_2-C_5)$ hydrocarbylene), substituted or unsubstituted $(C_1-C_3)$ heteroaryl, —H, halo, nitro, trihalomethyl, cyano, and —OH; and
p is about 0 to about 30.

Embodiment 46 provides the method of Embodiment 45, wherein p is about 1 to about 15.

Embodiment 47 provides the method of any one of Embodiments 45-46, wherein p is about 1 to about 6.

Embodiment 48 provides the method of any one of Embodiments 45-47, wherein $R^2$ is selected from the group consisting of $(C_1-C_{30})$hydrocarbyl, $(C_2-C_5)$hydrocarbylenepoly(oxy$(C_2-C_5)$hydrocarbylene), $(C_1-C_{30})$heteroaryl, —H, halo, nitro, trihalomethyl, cyano, and —OH.

Embodiment 49 provides the method of any one of Embodiments 45-48, wherein $R^2$ is selected from the group consisting of $(C_1-C_{15})$hydrocarbyl, $(C_2)$hydrocarbylenepoly(oxy$(C_2)$hydrocarbylene), $(C_1-C_1)$heteroaryl, —H, halo, nitro, trihalomethyl, cyano, and —OH.

Embodiment 50 provides the method of any one of Embodiments 45-49, wherein $R^2$ is selected from the group consisting of $(C_1-C_8)$alkyl, $(C_5-C_{15})$aryl, $(C_5-C_{15})$heteroaryl, halo, nitro, trihalomethyl, cyano, and —OH.

Embodiment 51 provides the method of any one of Embodiments 1-50, wherein the curing agent has the structure:

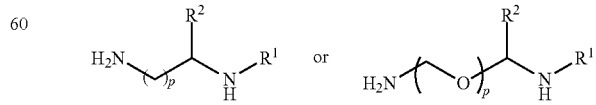

wherein
$R^1$ is selected from the group consisting of $(C_1-C_8)$alkyl, $(C_3-C_{15})$aryl, $(C_5-C_{15})$heteroaryl, and —OH, R² is selected from the group consisting of $(C_1-C_8)$alkyl, $(C_5-C_{15})$aryl, $(C_5-C_{15})$heteroaryl, —H, halo, nitro, trihalomethyl, cyano, and —OH, and p is about 1 to about 6.

Embodiment 52 provides the method of any one of Embodiments 1-51, wherein the composition further comprises a second curing agent.

Embodiment 53 provides the method of Embodiment 52, wherein the second curing agent comprises at least one of an amine, an aromatic amine, an aliphatic amine, a cycloaliphatic amine, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, and n-beta-(aminoethyl)-gamma-aminopropyl trimethoxysilane.

Embodiment 54 provides the method of any one of Embodiments 52-53, wherein the second curing agent is about 0.001 wt % to about 50 wt % of the composition.

Embodiment 55 provides the method of any one of Embodiments 52-54, wherein the second curing agent is about 0.01 wt % to about 20 wt % of the composition.

Embodiment 56 provides the method of any one of Embodiments 1-55, wherein the composition further comprises a carrier fluid.

Embodiment 57 provides the method of Embodiment 56, wherein the carrier fluid comprises at least one of an aqueous liquid, an organic liquid, and an oil.

Embodiment 58 provides the method of any one of Embodiments 56-57, wherein the carrier fluid is about 5 wt % to about 95 wt % of the composition.

Embodiment 59 provides the method of any one of Embodiments 56-58, wherein the carrier fluid is about 20 wt % to about 70 wt % of the composition.

Embodiment 60 provides the method of any one of Embodiments 1-59, wherein the composition further comprises a silane coupling agent.

Embodiment 61 provides the method of Embodiment 60, wherein the silane coupling agent is a hydrocarbyl-substituted trimethoxysilane, wherein the hydrocarbyl group is substituted or unsubstituted.

Embodiment 62 provides the method of any one of Embodiments 60-61, wherein the silane coupling agent is at least one of N-2-(aminoethyl)-3-aminopropyltrimethoxysilane, 3-glycidoxypropyltrimethoxysilane and n-beta-(aminoethyl)-gamma-aminopropyltrimethoxysilane.

Embodiment 63 provides the method of any one of Embodiments 60-62, wherein about 0.001 wt % to about 20 wt % of the composition is the silane coupling agent.

Embodiment 64 provides the method of any one of Embodiments 60-63, wherein about 0.001 wt % to about 3 wt % of the composition is the silane coupling agent.

Embodiment 65 provides the method of any one of Embodiments 1-64, wherein the composition further comprises a surfactant.

Embodiment 66 provides the method of Embodiment 65, wherein the surfactant comprises at least one of a cationic surfactant, an anionic surfactant, and non-ionic surfactant.

Embodiment 67 provides the method of any one of Embodiments 65-66, wherein the surfactant comprises at least one of ethoxylated nonyl phenol phosphate ester and a $C_{12}$-$C_{22}$ alkyl phosphonate.

Embodiment 68 provides the method of any one of Embodiments 65-67, wherein about 0.01 wt % to about 50 wt % of the composition is the surfactant.

Embodiment 69 provides the method of any one of Embodiments 65-68, wherein about 0.1 wt % to about 10 wt % of the composition is the surfactant.

Embodiment 70 provides the method of any one of Embodiments 1-69, wherein the composition further comprises a hydrolyzable ester.

Embodiment 71 provides the method of Embodiment 70, wherein the hydrolyzable ester comprises a $C_1$-$C_5$ mono-, di-, tri-, or tetra-alkyl ester of a $C_2$-$C_{40}$ mono-, di-, tri-, or tetra-carboxylic acid.

Embodiment 72 provides the method of any one of Embodiments 70-71, wherein the hydrolyzable ester comprises at least one of dimethylglutarate, dimethyladipate, dimethylsuccinate, sorbitol, catechol, dimethylthiolate, methyl salicylate, dimethylsalicylate, and tert-butylhydroperoxide.

Embodiment 73 provides the method of any one of Embodiments 70-72, wherein about 0.01 wt % to about 20 wt % of the composition is the hydrolyzable ester.

Embodiment 74 provides the method of any one of Embodiments 70-73, wherein about 0.1 wt % to about 5 wt % of the composition is the hydrolyzable ester.

Embodiment 75 provides a system for performing the method of any one of Embodiments 1-74, the system comprising:

a tubular disposed in a wellbore;

a pump configured to pump the composition downhole.

Embodiment 76 provides the method of any one of Embodiments 1-74, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 77 provides the method of any one of Embodiments 1-74, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

Embodiment 78 provides the method of any one of Embodiments 1-74, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, heology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 79 provides a method of treating a subterranean formation, the method comprising:
obtaining or providing a mixture comprising
a curable resin, wherein the resin is amine-curable;
a curing agent comprising at least one primary amine and at least one secondary amine;
a surfactant; and
a carrier fluid;
coating the mixture on a proppant or gravel, to provide a composition;
placing the composition in a subterranean formation, such that the composition contacts a fracture in the subterranean formation; and
curing the composition.

Embodiment 80 provides a system comprising:
a composition comprising
a curable resin, wherein the resin is amine-curable;
a curing agent having a structure comprising at least one primary amine and at least one secondary amine; and
a proppant or gravel; and
a subterranean formation comprising the composition therein.

Embodiment 81 provides the system of Embodiment 80, further comprising
a tubular disposed in a wellbore;
a pump configured to pump the composition downhole.

Embodiment 82 provides a composition for treatment of a subterranean formation, the composition comprising:
a curable resin, wherein the resin is amine-curable;
a curing agent having a structure comprising at least one primary amine and at least one secondary amine; and
a proppant or gravel.

Embodiment 83 provides the composition of Embodiment 82, further comprising a surfactant.

Embodiment 84 provides the composition of any one of Embodiments 82-83, further comprising a carrier fluid.

Embodiment 85 provides the composition of any one of Embodiments 82-84, wherein the composition is a composition for fracturing of a subterranean formation.

Embodiment 86 provides a composition for treatment of a subterranean formation, the composition comprising:
a curable epoxy or isocyanate resin, wherein the resin is amine-curable;
a curing agent having a structure comprising at least one primary amine and at least one secondary amine, the curing agent having the structure

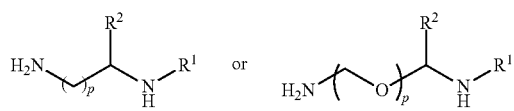

wherein
$R^1$ is selected from the group consisting of $(C_1-C_8)$alkyl, $(C_5-C_{15})$aryl, $(C_5-C_{15})$heteroaryl, and —OH,
$R^2$ is selected from the group consisting of $(C_1-C_8)$alkyl, $(C_5-C_{15})$aryl, $(C_5-C_{15})$heteroaryl, —H, halo, nitro, trihalomethyl, cyano, and —OH, and
p is about 1 to about 6; and
a proppant or gravel.

Embodiment 87 provides a method of preparing a composition for treatment of a subterranean formation, the method comprising:

forming a composition comprising
a curable resin, wherein the resin is amine-curable;
a curing agent having a structure comprising at least one primary amine and at least one secondary amine; and
a proppant or gravel.

Embodiment 88 provides the composition, apparatus, method, or system of any one or any combination of Embodiments 1-87 optionally configured such that all elements or options recited are available to use or select from.

What is claimed is:

1. A method of treating a subterranean formation, comprising:
placing in the subterranean formation a composition comprising:
a curable resin, wherein the resin is amine-curable; and
a curing agent having a structure comprising at least one primary amine and at least one secondary amine
wherein the composition has at least a first and a second curing stage and a consolidation strength of the first stage being less than a consolidation strength of the second stage, wherein the first curing stage comprises curing of the curable resin with the primary amine group of the curing agent, and wherein the second curing stage comprises curing of the curable resin with the secondary amine of the curing agent.

2. The method of claim 1, wherein the composition further comprises at least one of proppant and gravel.

3. The method of claim 1, comprising fracturing the subterranean formation to form at least one fracture in the subterranean formation.

4. The method of claim 1, further comprising at least partially curing the composition.

5. The method of claim 4, further comprising removing partially cured resin from the subterranean formation before the curing is complete.

6. The method of claim 1, wherein the curable resin comprises at least one of an epoxy resin and an isocyanate resin.

7. The method of claim 1, wherein the composition further comprises at least one tackifier.

8. The method of claim 1, wherein the curing agent is at least one of an unsymmetrical diamine and a polyamine.

9. The method of claim 1, wherein the curing agent has the structure:

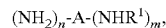

wherein:
A is selected from the group consisting of a substituted or unsubstituted $(C_1-C_{30})$hydrocarbylene interrupted or terminated by 0, 1, 2, or 3 O or S atoms, and a substituted or unsubstituted $(C_2-C_5)$hydrocarbylene-poly(oxy$(C_2-C_5)$hydrocarbylene);
$R^1$ at each occurrence is independently selected from the group consisting of substituted or unsubstituted $(C_1-C_{30})$hydrocarbyl interrupted or terminated by 0, 1, 2, or 3 O or S atoms, substituted or unsubstituted $(C_2-C_5)$hydrocarbylenepoly(oxy$(C_2-C_5)$hydrocarbylene), substituted or unsubstituted $(C_1-C_{30})$heteroaryl, and —OH; and
n and m are each independently 1 to about 1,000.

10. The method of claim 9, wherein the curing agent has the structure:

11. The method of claim 9, wherein the curing agent has the structure:

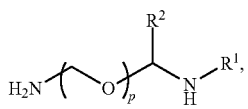

wherein:
R² is selected from the group consisting of substituted or unsubstituted (C₁-C₃₀)hydrocarbyl interrupted or terminated by 0, 1, 2, or 3 O or S atoms, substituted or unsubstituted (C₂-C₅)hydrocarbylenepoly(oxy(C₂-C₅)hydrocarbylene), substituted or unsubstituted (C₁-C₃₀)heteroaryl, —H, halo, nitro, trihalomethyl, cyano, and —OH; and
p is 1 to about 30.

12. The method of claim 9, wherein the curing agent has the structure:

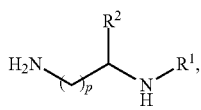

wherein:
R² is selected from the group consisting of substituted or unsubstituted (C₁-C₃₀)hydrocarbyl interrupted or terminated by 0, 1, 2, or 3 O or S atoms, substituted or unsubstituted (C₂-C₅)hydrocarbylenepoly(oxy(C₂-C₅)hydrocarbylene), substituted or unsubstituted (C₁-C₃₀)heteroaryl, —H, halo, nitro, trihalomethyl, cyano, and —OH; and
p is 0 to about 30.

13. The method of claim 1, wherein the curing agent has the structure:

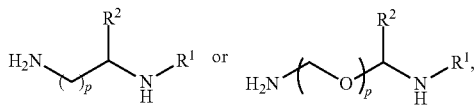

wherein:
R¹ is selected from the group consisting of (C₁-C₈) alkyl, (C₅-C₁₅)aryl, (C₅-C₁₅)heteroaryl, and —OH,
R² is selected from the group consisting of (C₁-C₈) alkyl, (C₅-C₁₅)aryl, (C₅-C₁₅)heteroaryl, —H, halo, nitro, trihalomethyl, cyano, and —OH, and
p is 1 to about 6.

14. The method of claim 1, wherein the composition further comprises a second curing agent comprising at least one of an amine, an aromatic amine, an aliphatic amine, a cyclo-aliphatic amine, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, or any combination thereof.

15. The method of claim 1, wherein the composition further comprises at least one of a carrier fluid, a silane coupling agent, a surfactant, a hydrolyzable ester, or any combination thereof.

16. A system for performing the method of claim 1, the system comprising:
a tubular disposed in the subterranean formation; and
a pump configured to pump the composition through the tubular in the subterranean formation.

17. A method of treating a subterranean formation, comprising:
placing a composition in the subterranean formation, the subterranean formation comprising a fracture, the composition comprising:
a proppant or gravel coated with a mixture comprising:
a curable resin, wherein the resin is amine-curable;
a curing agent having a structure comprising at least one primary amine and at least one secondary amine;
a surfactant; and
a carrier fluid,
wherein the mixture has at least a first and a second curing stage and a consolidation strength of the first stage being less than a consolidation strength of the second stage, wherein the first curing stage comprises curing of the curable resin with the primary amine group of the curing agent, and wherein the second curing stage comprises curing of the curable resin with the secondary amine of the curing agent; and
curing the composition.

18. A composition for treatment of a subterranean formation, comprising:
a curable resin, wherein the resin is amine-curable;
a curing agent having a structure comprising at least one primary amine and at least one secondary amine; and
a proppant or gravel,
wherein the composition has at least a first and a second curing stage and a consolidation strength of the first stage being less than a consolidation strength of the second stage, wherein the first curing stage comprises curing of the curable resin with the primary amine group of the curing agent, and wherein the second curing stage comprises curing of the curable resin with the secondary amine of the curing agent.

* * * * *